United States Patent
Lee (10) Patent No.: US 9,310,633 B2
(45) Date of Patent: Apr. 12, 2016

(54) DISPLAY DEVICE

(75) Inventor: Jung Mok Lee, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 525 days.

(21) Appl. No.: 12/601,724

(22) PCT Filed: May 28, 2008

(86) PCT No.: PCT/KR2008/002979
§ 371 (c)(1),
(2), (4) Date: Nov. 24, 2009

(87) PCT Pub. No.: WO2008/147102
PCT Pub. Date: Dec. 4, 2008

(65) Prior Publication Data
US 2010/0171898 A1 Jul. 8, 2010

(30) Foreign Application Priority Data

Jun. 1, 2007 (KR) .................. 10-2007-0053864
Jun. 20, 2007 (KR) .................. 10-2007-0060307

(51) Int. Cl.
*G02F 1/1333* (2006.01)
*G02F 1/1335* (2006.01)

(52) U.S. Cl.
CPC .... *G02F 1/133308* (2013.01); *G02F 1/133608* (2013.01); *G02F 2001/133322* (2013.01); *G02F 2201/503* (2013.01)

(58) Field of Classification Search
CPC .................. G02F 1/133608; G02F 2201/503; G02F 1/133308; G02F 2001/133322
See application file for complete search history.

(56) References Cited

U.S. PATENT DOCUMENTS

| | | | | |
|---|---|---|---|---|
| 5,486,942 | A * | 1/1996 | Ichikawa et al. | 349/58 |
| 6,909,475 | B2 * | 6/2005 | Kojima et al. | 349/58 |
| 2002/0044234 | A1 * | 4/2002 | Choi | 349/65 |
| 2003/0043314 | A1 * | 3/2003 | Lee et al. | 349/65 |
| 2003/0223020 | A1 * | 12/2003 | Lee | 349/58 |
| 2004/0169785 | A1 * | 9/2004 | You et al. | 349/61 |
| 2005/0280750 | A1 * | 12/2005 | Cho et al. | 349/58 |
| 2006/0028790 | A1 * | 2/2006 | Baek | 361/681 |
| 2006/0050195 | A1 * | 3/2006 | Choi et al. | 349/58 |
| 2007/0046859 | A1 * | 3/2007 | Huang et al. | 349/65 |
| 2007/0115401 | A1 * | 5/2007 | Tsubokura et al. | 349/58 |
| 2008/0111936 | A1 * | 5/2008 | Kim | 349/58 |

FOREIGN PATENT DOCUMENTS

| | | | |
|---|---|---|---|
| CN | 2616924 Y | 5/2004 | |
| JP | 2007-121339 A | 5/2007 | |
| KR | 10-2000-0009873 A | 2/2000 | |
| KR | 10-2000-0009875 A | 2/2000 | |
| KR | 10-2000-0042167 A | 7/2000 | |
| KR | 10-2004-0071833 A | 8/2004 | |
| KR | 10-0452419 B1 | 10/2004 | |
| KR | 10-2006-0012829 A | 2/2006 | |
| KR | 10-2006-0133821 A | 12/2006 | |
| KR | 10-2007-0052082 A | 5/2007 | |
| KR | 10-0722097 B1 | 5/2007 | |

* cited by examiner

*Primary Examiner* — Jessica M Merlin
(74) *Attorney, Agent, or Firm* — Birch, Stewart, Kolasch & Birch, LLP (57) ABSTRACT

Disclosed is a display device. The display device comprises a receptacle comprising a sidewall section, and a support section extending from an inner side of the sidewall section and a liquid crystal panel and a backlight assembly, at least one of which is received in the receptacle.

18 Claims, 10 Drawing Sheets

DISPLAY DEVICE

CROSS-REFERENCE TO RELATED APPLICATIONS

This application is the U.S. national stage application of International Patent Application No. PCT/KR2008/002979, filed May 28, 2008, which claims priority to Korean Application Nos. 10-2007-0053864, filed Jun. 1, 2007 and 10-2007-0060307, filed Jun. 20, 2007, the disclosures of each of which are incorporated herein by reference in their entirety.

TECHNICAL FIELD

The embodiment relates to a display device.

BACKGROUND ART

An LCD (liquid crystal display) is a display device having low power consumption, light weight and small volume. The display device has been extensively used for computer industry, electronic industry, information communication industry and the like. In particular, the display device has been variously applied to display devices of various portable terminals.

A display device comprises a liquid crystal panel provided with a TFT panel for displaying image information, a backlight assembly for providing light to the liquid crystal panel, a mold frame for receiving the liquid crystal panel and the backlight assembly, and a chassis coupled with the mold frame.

The backlight assembly and the liquid crystal panel are fixed to the mold frame. The chassis is coupled with the mold frame to reinforce the strength of the backlight assembly, and has a structure corresponding to the external appearance of the mold frame.

The chassis is coupled with the mold frame or integrally formed with the mold frame through an insert injection molding process. At this time, the mold frame must have a thickness suitable for the insert injection molding process. Thus, the thickness of the display device is increased due to the thickness of the mold frame.

DISCLOSURE OF INVENTION

Technical Problem

The embodiment provides a display device having improved strength.

Technical Solution

The display device according to the embodiment comprises: a receptacle comprising a sidewall section, and a support section extending from an inner side of the sidewall section; and a liquid crystal panel and a backlight assembly, at least one of which is received in the receptacle.

The display device according to the embodiment comprises the steps of: forming a first chassis provided with sidewalls for receiving at least one of a liquid crystal panel and a backlight assembly; forming a second chassis provided with sidewalls coupled with the first chassis; and coupling the first chassis with the second chassis.

ADVANTAGEOUS EFFECTS

According to the embodiment, the structure of the display device is modified such that the display device has improved strength as well as a slim size.

BEST MODE FOR CARRYING OUT THE INVENTION

Hereinafter, preferred embodiments will be described with reference to the accompanying drawings.

Figure 1:
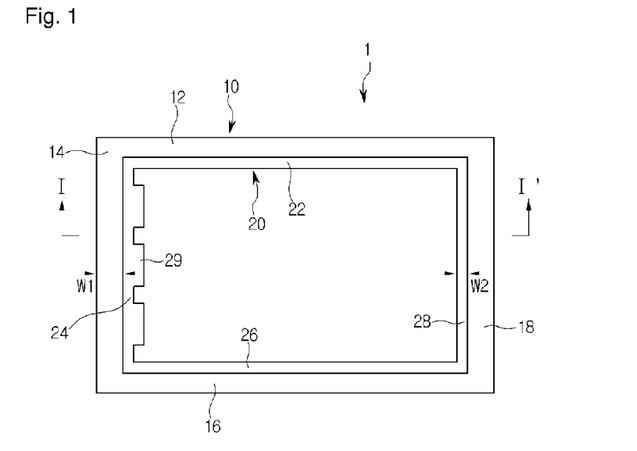
FIG. 1 is a plan view illustrating a receptacle of a display device according to a first embodiment.
Figure 2:
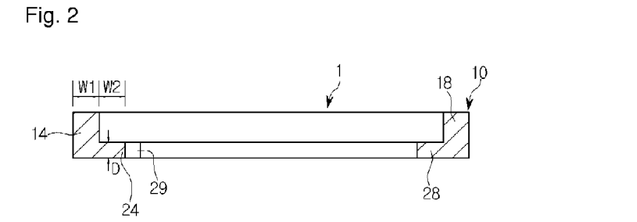
FIG. 2 is a sectional view taken along line I-I' in FIG. 1.

FIG. 1 is a plan view illustrating a receptacle of a display device according to a first embodiment, and FIG. 2 is a sectional view taken along line I-I' in FIG. 1.

The display device according to the first embodiment comprises a display section (not shown) and a receptacle 1.

Referring to FIGS. 1 and 2, the receptacle 1 comprises a sidewall section 10 and a support section 20.

For example, the sidewall section 10 of the receptacle 1 comprises four sidewalls classified into a first sidewall 12, a second sidewall 14, a third sidewall 16 and a fourth sidewall 18.

The first sidewall 12 faces the third sidewall 16 and the second sidewall 14 faces the fourth sidewall 18. The first to fourth sidewalls 12, 14, 16 and 18 are interconnected to form a closed loop. When viewed in a plan view, the first to fourth sidewalls 12, 14, 16 and 18 form a rectangular frame.

The first to fourth sidewalls 12, 14, 16 and 18 have widths W1 of about 0.1 mm to 3.0 mm, respectively. The support section 20 is integrally formed with the sidewall section 10 of the receptacle 1. Further, the support section 20 extends or protrudes from the lower end portion of an inner side of the sidewall section 10 of the receptacle 1 by a predetermined length.

The support section 20 comprises a first support 22, a second support 24, a third support 26 and a fourth support 28.

The first support 22 protrudes from the inner side of the first sidewall 12, and the second support 24 protrudes from the inner side of the second sidewall 14. The third support 26 protrudes from the inner side of the third sidewall 16 and the fourth support 28 protrudes from the inner side of the fourth sidewall 18.

The first to fourth supports 22, 24, 26 and 28, which protrude from the first to fourth sidewalls 12, 14, 16 and 18 may have widths W2 of about 0.5 mm to 2.0 mm, respectively. Further, the first to fourth supports 22, 24, 26 and 28 may have thicknesses D of about 0.1 mm to 1.0 mm, respectively.

According to the embodiment, the support section 20 comprising the first to fourth supports 22, 24, 26 and 28 may be integrally formed with each other. Further, the sidewall section 10 and the support section 20 may comprise metal such as stainless steel, iron, aluminum, aluminum alloy or copper. In addition, the sidewall section 10 and the support section 20 may comprise various metals.

Referring again to FIG. 1, at least one protrusion 29 may protrude from the side of at least one of the first to fourth supports 22, 24, 26 and 28 that constitute the support section 20. For example, three protrusions 29 protrude from the side of the second support 24. The protrusions 29 are spaced apart from each other by a predetermined interval. Light sources such as light emitted diodes (not shown) may be provided among the protrusions 29.

Figure 3:
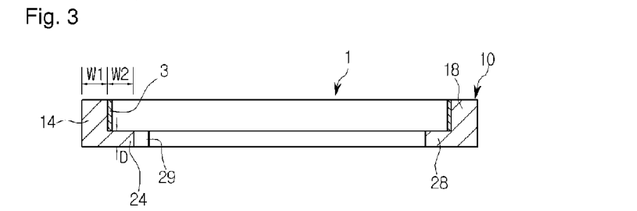
FIG. 3 is a sectional view illustrating a state in which an impact absorption member is formed in a receptacle according to a first embodiment.

FIG. 3 is a sectional view illustrating a state in which an impact absorption member is formed in the receptacle according to the first embodiment.

Referring to FIG. 3, the receptacle 1 comprises the sidewall section 10, the support section 20 and the impact absorption member 3.

The support section 20 is integrally formed with the sidewall section 10. When the receptacle 1 comprises metal that does not easily absorb external impact and/or vibration, an optical member and a liquid crystal provided in the receptacle 1 may be easily broken due to the external impact and/or vibration.

Thus, the impact absorption member 3 can be provided in the inner side of the sidewall section 10 in order to prevent the optical member and the liquid crystal provided from being broken due to the external impact and/or vibration.

The impact absorption member 3 can comprise synthetic resin having elasticity in order to absorb the external impact and/or vibration.

The impact absorption member 3 can be continuously provided along the inner side of the sidewall section 10. Further, a plurality of the impact absorption members 3 can be provided along the inner side of the sidewall section 10 while being spaced apart from each other by a predetermined interval. Furthermore, the impact absorption member 3 can be provided on the upper surface of the support section 20 as well as the inner side of the sidewall section 10.

The impact absorption member 3 can prevent the optical member and the liquid crystal provided from being broken by efficiently absorbing the external impact and/or vibration. Further, the impact absorption member 3 can prevent the inner side of the backlight assembly from being contaminated by removing micro particles penetrating into the receptacle 1.

Figure 4:
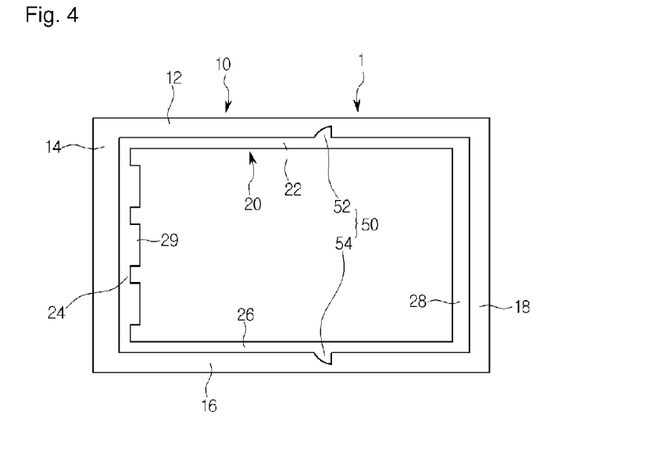
FIG. 4 is a plan view illustrating a state in which locking grooves are formed in a receptacle according to a first embodiment.

FIG. 4 is a plan view illustrating a state in which locking grooves are formed in the receptacle according to the first embodiment. The receptacle illustrated in FIG. 4 is substantially identical to the receptacle described in FIGS. 1 and 2, except for the locking grooves.

Referring to FIG. 4, the receptacle 1 comprises the sidewall section 10, the support section 20 and the locking grooves 50.

The locking grooves 50 can be provided in a part of the sidewall section 10 of the receptacle 1. According to the embodiment, the locking grooves 50 are provided in the first sidewall 12 and the third sidewall 16, respectively. The locking groove 50 provided in the first sidewall 12 will be referred to as a first locking groove 52 and the locking groove 50 provided in the third sidewall 16 will be referred to as a second locking groove 54.

A plurality of the first and second locking grooves 52 and 54 may be provided in the first and third sidewalls 12 and 16, respectively. In addition, the locking grooves 50 may also be provided in the second sidewall 14 and/or the fourth sidewall 18 of the sidewall section 10.

The locking grooves 50 may also be provided in the support section 20 connected to the sidewall section 10 as well as the sidewall section 10.

Further, locking protrusions, which are provided in an optical member such as a light guide plate or an optical sheet, are coupled with the locking grooves 50 provided in the support section 20 or the sidewall section 10, so that the optical member can be prevented from moving in the receptacle 1.

FIGS. 5 to 8 are plan views and sectional views illustrating a method for manufacturing the receptacle of the display device according to the first embodiment.

Figure 5:
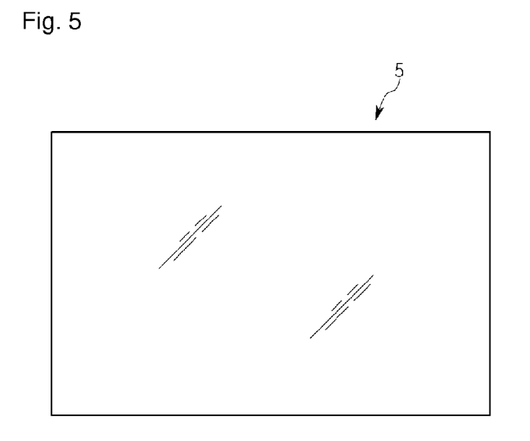
FIGS. 5 to 8 are plan views and sectional views illustrating a method for manufacturing a receptacle of a display device according to a first embodiment.

Referring to FIG. 5, a metal plate 5 is provided in order to manufacture the receptacle of the display device. According to the embodiment, the metal plate 5 may comprise stainless steel, iron, aluminum, aluminum alloy, copper and the like in order to protect the light source, the optical member and the liquid crystal panel, which are provided in the receptacle, from the external impact and/or vibration.

Figure 6:
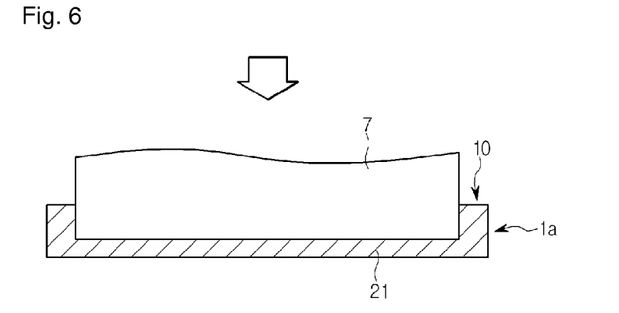
Figure 7:
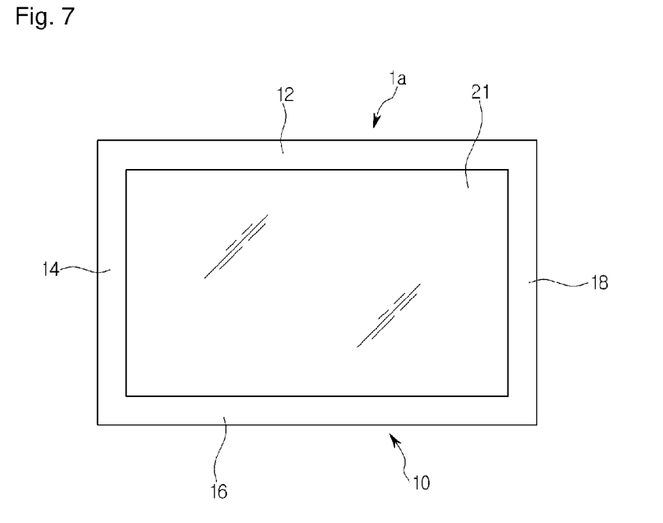

Referring to FIG. 6, the metal plate 5 is primarily processed by a press apparatus 7. The press apparatus 7 presses the central portion of the metal plate 5 illustrated in FIG. 5, thereby fabricating a primary receptacle 1a comprising the sidewall section 10 and a bottom plate 21.

According to the embodiment, the sidewall section 10 of the primary receptacle 1a, which is formed by pressing the central portion of the metal plate 5 through the press apparatus 7, comprises the first to fourth sidewalls 12, 14, 16 and 18. Further, the first to fourth sidewalls 12, 14, 16 and 18 may have widths of about 0.1 mm to 3.0 mm, respectively. The widths of the first to fourth sidewalls 12, 14, 16 and 18 can be freely adjusted by adjusting the size of the press apparatus 7.

Further, the bottom plate 21 formed by the press apparatus 7 may have a thickness of about 0.1 mm to 1.0 mm.

Furthermore, if the primary receptacle 1a is fabricated by processing the metal plate through the press apparatus 7, the first to fourth sidewalls 12, 14, 16 and 18 and the bottom plate 21 may have narrow widths and thin thicknesses, which are not easily achievable when they are fabricated through an injection molding process by using synthetic resin.

In addition, when forming the sidewall section 10 and the bottom plate 21 through the press apparatus 7, locking grooves (not shown) can be formed in the inner side of the sidewall section 10. Further, locking protrusions that protrude from the optical member, such as a light guide plate or an optical sheet, are coupled with the locking grooves, so that the optical member can be prevented from moving.

Figure 8:
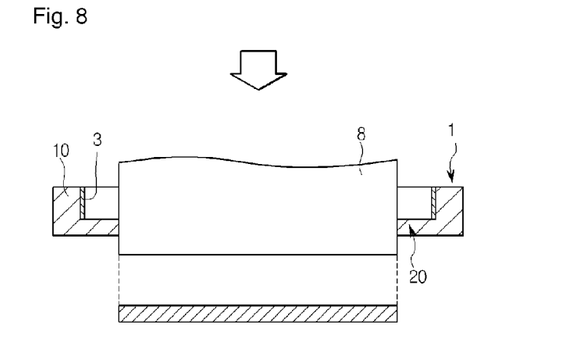

Referring to FIG. 8, after fabricating the primary receptacle 1a, which is provided with the sidewall section 10 and the bottom plate 21, through the press apparatus 7, the impact absorption member 3 may be formed at the inner side of the sidewall section 10.

The impact absorption member 3 absorbs the external impact and/or vibration, thereby preventing the brittle light source and/or optical member from being broken.

The impact absorption member 3 may be formed at the inner side of the sidewall section 10 through a coating process or an injection molding process. A plurality of impact absorption members 3 can be continuously formed along the inner side of the sidewall section 10 while being spaced apart from each other by a predetermined interval. Further, the impact absorption member 3 may also be formed on the upper surface of the support section 20 as well as the inner side of the sidewall section 10.

Referring again to FIGS. 1, 6 and 8, after fabricating the primary receptacle 1a, which is provided with the sidewall section 10 and the bottom plate 21, through the press apparatus 7 as shown in FIG. 6, the bottom plate 21 is cut by a cutter 8 to fabricate the receptacle 1 provided with the sidewall section 10 and the support section 20.

The support section 20, which is formed by cutting the bottom plate 21 through the cutter 8, comprises the first to fourth supports 22, 24, 26 and 28 as illustrated in FIG. 1. The first support 22 extends from the inner side of the first sidewall 12, and the second support 24 extends from the inner side of the second sidewall 14. The third support 26 extends from the inner side of the third sidewall 16 and the fourth support 28 extends from the inner side of the fourth sidewall 18.

The first to fourth supports 22, 24, 26 and 28, which extend from the inner sides of the first to fourth sidewalls 12, 14, 16 and 18 respectively, may have extension lengths of about 0.5 mm to 2.0 mm. Further, the first to fourth supports 22, 24, 26 and 28 support the optical member and/or the liquid crystal panel.

Referring again to FIGS. 1 and 8, a plurality of protrusions 29 may protrude from the side of the second support 24 of the support section 20 formed through the cutting process using the cutter 8. Light sources such as light emitting diodes (not shown) are coupled with the protrusions 29.

Figure 9:
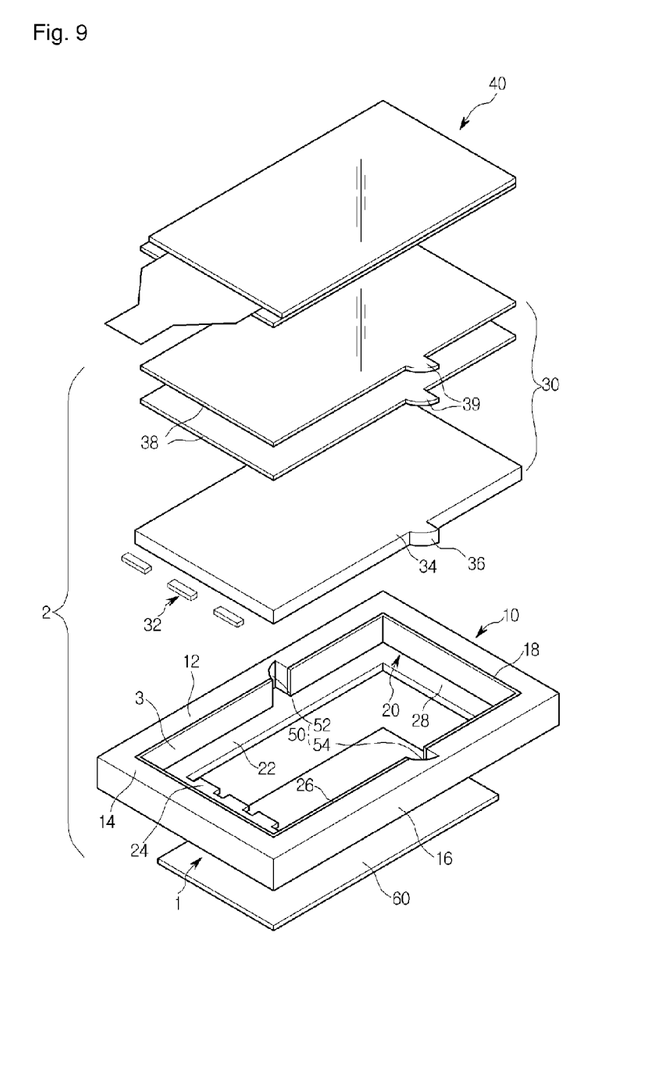
FIG. 9 is an exploded perspective view of a display device according to a first embodiment.
Figure 10:
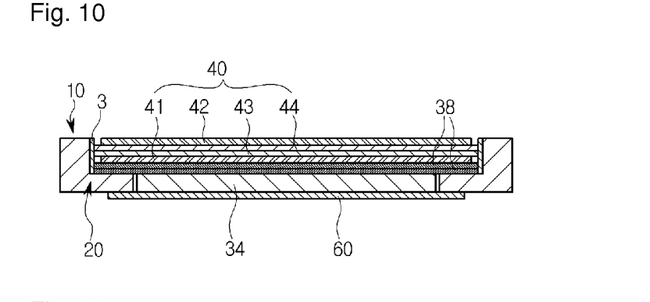
FIG. 10 is a sectional view of the display device shown in FIG. 9.

FIG. 9 is an exploded perspective view of the display device according to the first embodiment and FIG. 10 is a sectional view of the display device shown in FIG. 9.

Referring to FIGS. 9 and 10, the display device comprises the display unit and the receptacle 1.

The display unit comprises a backlight assembly 2 provided with an optical reflection member 60 and an optical member 30, and a liquid crystal panel 40.

The receptacle 1 comprises the sidewall section 10 and the support section 20.

For example, the sidewall section 10 of the receptacle 1 comprises four sidewalls classified into the first sidewall 12, the second sidewall 14, the third sidewall 16 and the fourth sidewall 18.

The first sidewall 12 faces the third sidewall 16 and the second sidewall 14 faces the fourth sidewall 18. The first to fourth sidewalls 12, 14, 16 and 18 are interconnected to form a closed loop. When viewed in a plan view, the first to fourth sidewalls 12, 14, 16 and 18 form a rectangular frame.

The first to fourth sidewalls 12, 14, 16 and 18 may have widths of about 0.1 mm to 3.0 mm, respectively.

The support section 20 is integrally formed with the sidewall section 10 of the receptacle 1. Further, the support section 20 extends or protrudes from the lower end portion of an inner side of the sidewall section 10 of the receptacle 1 by a predetermined length.

The support section 20 comprises the first support 22, the second support 24, the third support 26 and the fourth support 28.

The first support 22 protrudes from the inner side of the first sidewall 12, and the second support 24 protrudes from the inner side of the second sidewall 14. The third support 26 protrudes from the inner side of the third sidewall 16 and the fourth support 28 protrudes from the inner side of the fourth sidewall 18.

The first to fourth supports 22, 24, 26 and 28, which protrude from the first to fourth sidewalls 12, 14, 16 and 18 may have widths of about 0.5 mm to 2.0 mm, respectively. Further, the first to fourth supports 22, 24, 26 and 28 may have thicknesses D of about 0.1 mm to 1.0 mm, respectively.

According to the embodiment, the sidewall section 10 that comprises the first to fourth sidewalls 12, 14, 16 and 18 is integrally formed with the support section 20 that comprises the first to fourth supports 22, 24, 26 and 28. Further, the sidewall section 10 and the support section 20 may comprise metal such as stainless steel, iron, aluminum, aluminum alloy or copper. In addition, the sidewall section 10 and the support section 20 may comprise various metals.

Further, at least one protrusion 29 may protrude from the side of at least one of the first to fourth supports 22, 24, 26 and 28 that constitute the support section 20. According to the embodiment, three protrusions 29 protrude from the side of the second support 24. The protrusions 29 are spaced apart from each other by a predetermined interval. Light sources such as light emitted diodes 32 may be provided among the protrusions 29.

The support section 20 is integrally formed with the sidewall section 10. When the receptacle 1 comprises metal that does not easily absorb the external impact and/or vibration, the optical member and the liquid crystal provided in the receptacle 1 may be easily broken due to the external impact and/or vibration.

Thus, the impact absorption member 3 may be provided in the inner side of the sidewall section 10 in order to prevent the optical member and the liquid crystal provided from being broken due to the external impact and/or vibration.

The impact absorption member 3 may comprise synthetic resin having elasticity in order to absorb the external impact and/or vibration.

The impact absorption member 3 may be continuously provided along the inner side of the sidewall section 10. Further, a plurality of the impact absorption members 3 may be provided along the inner sides of the sidewall section 10 while being spaced apart from each other by a predetermined interval. Furthermore, the impact absorption member 3 may be provided on the upper surface of the support section 20 as well as the inner side of the sidewall section 10.

The impact absorption member 3 efficiently absorbs the external impact and/or vibration, thereby preventing the optical member and the liquid crystal provided from being broken. Further, the impact absorption member 3 removes micro particles penetrating into the receptacle 1, thereby preventing the inner side of the backlight assembly 2 from being contaminated.

Further, the locking grooves 50 may be provided in a part of the sidewall section 10 of the receptacle 1. For example, the locking grooves 50 are provided in the first sidewall 12 and the third sidewall 16, respectively. The locking groove 50 provided in the first sidewall 12 is referred to as the first locking groove 52 and the locking groove 50 provided in the third sidewall 16 is referred to as the second locking groove 54.

Further, a plurality of the first and second locking grooves 52 and 54 may be provided in the first and third sidewalls 12 and 16, respectively. In addition, the locking grooves 50 may also be provided in the second sidewall 14 and/or the fourth sidewall 18.

Meanwhile, the locking grooves 50 may also be provided in the support section 20 connected to the sidewall section 10 as well as the sidewall section 10.

Further, locking protrusions 36 and 39, which are provided in the optical member 30 such as a light guide plate 34 or an optical sheet 38, are coupled with the locking grooves 50 provided in the support section 20 or the sidewall section 10, so that the optical member 30 can be prevented from moving in the receptacle 1.

Referring again to FIG. 9, the optical reflection member 60 is provided on the rear surface of the receptacle 1 to cover a through hole formed by the support section 20. The optical reflection member 60 prevents light, which is generated from the light source such as the light emitted diode 32, from being leaked to the rear surface of the receptacle 1 through the through hole formed by the support section 20 and causing reduction in brightness of light.

The optical reflection member 60 may comprise white synthetic resin having high light reflectivity. Further, the optical reflection member 60 may comprise a metal plate having high light reflectivity. In addition, the optical reflection member 60 may comprise a white synthetic resin film coated on a metal plate.

The optical member 30 is provided in the receptacle 1. For example, the optical member 30 comprises the light source 32, the light guide plate 34 and the optical sheet 38.

The light source 32 is coupled with the protrusion 29 that protrudes from the support section 20 formed in the receptacle 1, and generates light necessary for displaying an image. For example, the light source 32 may comprise a light emitted diode, a CCFL (cold cathode fluorescent lamp) and the like.

The light guide plate 34 improves the brightness uniformity of light generated from the light source 32. The light guide plate 34 is provided in a space formed by the support section 20 and the optical reflection member 60. The locking protrusion 36 that is coupled with the locking groove 50 to prevent the light guide plate 34 from moving is provided in a side of the light guide plate 34, which corresponds to the locking groove 50 formed in the receptacle 1.

The optical sheet 38 is provided on the light guide plate 34. The optical sheet 38 may comprise a diffusion sheet or a prism sheet for improving the brightness or brightness uniformity of an image by allowing light, which is output from the light guide plate 34 at a predetermined inclination angle, to be perpendicularly incident into the liquid crystal panel 40.

The locking protrusion 39 that is coupled with the locking groove 50 to prevent the optical sheet 38 from moving is provided in a side of the optical sheet 38, which corresponds to the locking groove 50 formed in the receptacle 1.

Further, the liquid crystal panel 40 may be provided on the backlight assembly 2 installed in the receptacle 1.

Referring to FIG. 10, the liquid crystal panel 40 comprises a TFT substrate 43, which includes a plurality of thin film transistors and pixel electrodes connected to the thin film transistors, and a color filter substrate 44 which includes a color filter, a common electrode and the like while facing the TFT substrate 43. Further, the liquid crystal panel 40 comprises a liquid crystal layer interposed between the TFT substrate 43 and the color filter substrate 44, a first polarizer 41 provided at the lower surface of the TFT substrate 43, and a second polarizer 42 provided on the color filter substrate 44.

Figure 11:
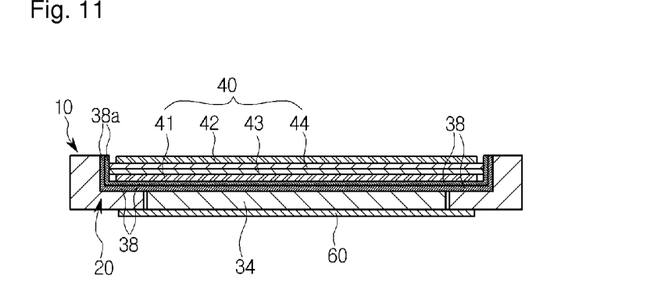
FIG. 11 is a sectional view illustrating another type of an optical sheet of the display device shown in FIG. 10.

FIG. 11 is a sectional view illustrating another type of the optical sheet coupled in the receptacle of the display device shown in FIG. 10. The display device of FIG. 11 is substantially identical to the display device of FIGS. 9 and 10, except for the optical sheet of the backlight assembly. Thus, a detailed description about the same elements will be omitted and the same reference names and numerals are used to designate the same elements.

Referring to FIG. 11, the display device comprises the display unit provided the backlight assembly 2 and the liquid crystal panel 40, and the receptacle 1. The backlight assembly 2 comprises the optical reflection member 60 and the optical member 30.

According to the embodiment, the optical sheet 38 of the optical member 30 covers the upper surface of the support section 20, and a part of the optical sheet 38 forms a bending section 38a which is bent such that the bending section 38a can be provided along the inner side of the sidewall section 10.

The bending section 38a is provided along the inner side of the sidewall section 10, thereby absorbing impact and/or vibration applied from the outside of the receptacle 1 without installing an additional impact absorption member for absorbing the impact and/or vibration.

Hereinafter, a display device according to a second embodiment will be described in detail with reference to FIGS. 12 to 21.

The display device according to the second embodiment comprises a display unit (not shown) and a receptacle.

Figure 12:
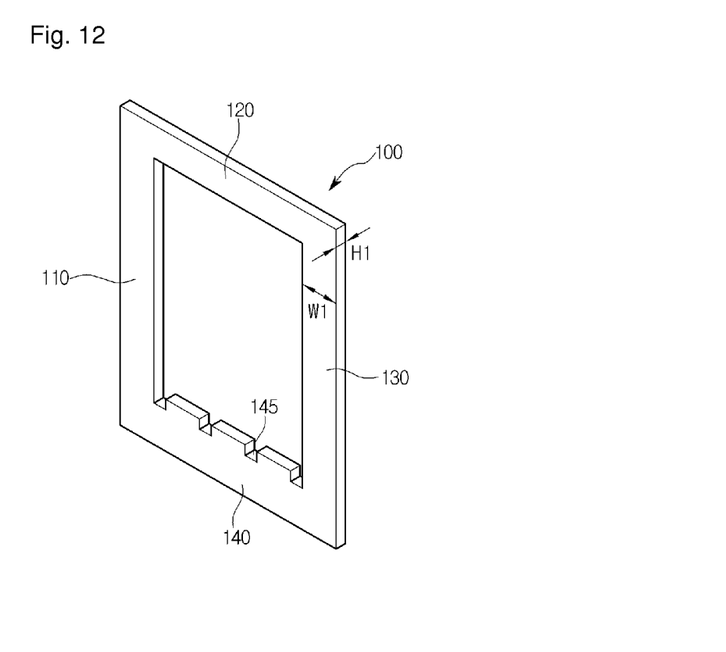
FIG. 12 is a perspective view illustrating a first chassis of a receptacle of a display device according to a second embodiment.
Figure 13:
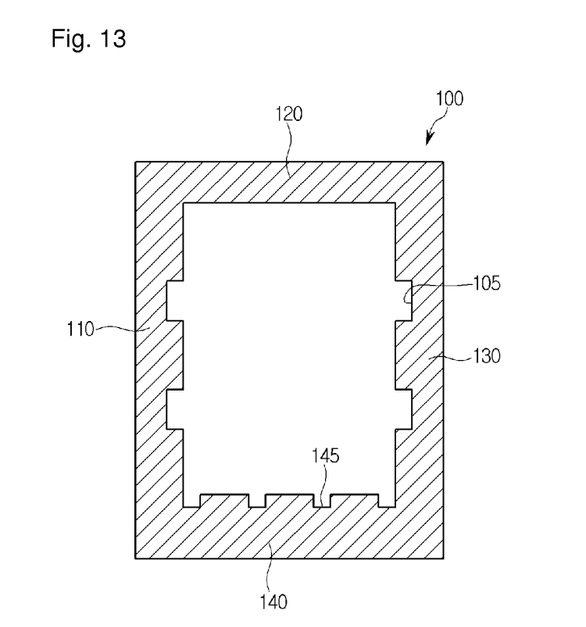
FIG. 13 is a plan view illustrating a state in which receiving grooves are formed in a first chassis shown in FIG. 12.
Figure 14:
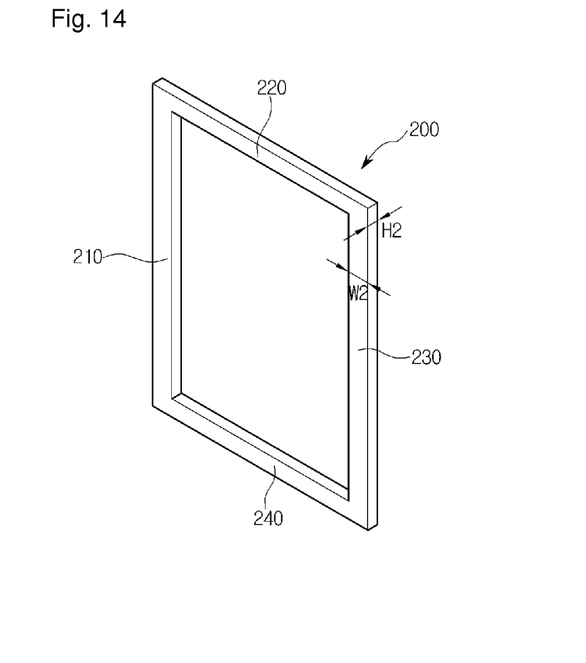
FIG. 14 is a perspective view illustrating a second chassis of a receptacle of a display device according to a second embodiment.

FIGS. 12 to 14 are views illustrating a first chassis 100 and a second chassis 200 of the receptacle of the display device according to the second embodiment.

Referring to FIG. 12, the first chassis 100 receives a display unit that comprises at least one of a backlight assembly and a liquid crystal panel. The first chassis 100 comprises a plurality of sidewalls.

For example, the first chassis 100 may comprise four sidewalls forming a rectangular frame. Hereinafter, the four sidewalls will be referred to as a first sidewall 110, a second sidewall 120, a third sidewall 130 and a fourth sidewall 140.

The first sidewall 110 faces the third sidewall 130 and the second sidewall 120 faces the fourth sidewall 140. The first to fourth sidewalls 110, 120, 130 and 140 are interconnected to form a closed loop. When viewed in a plan view, the first to fourth sidewalls 110, 120, 130 and 140 form a rectangular frame.

Further, lamp receiving grooves 145 may be formed in the inner side of the fourth sidewall 140 such that light sources of the backlight assembly can be received in the lamp receiving grooves 145.

Referring to FIG. 13, grooves 105 for receiving light guide plates, which have various shapes such as triangular shapes or rectangular shapes, can be formed in the first and third sidewalls 110 and 130 such that the light guide plates of the backlight assembly can be received in the grooves 105.

For example, the first to fourth sidewalls 110, 120, 130 and 140 may have widths W1 of about 0.1 mm to 3.0 mm, respectively. Further, the first to fourth sidewalls 110, 120, 130 and 140 may have heights H1 of about 0.1 mm to 2.0 mm, respectively.

The first chassis 100 may comprise metal. For example, the first chassis 100 may comprise at least one of stainless steel, iron, aluminum, aluminum alloy and copper. In addition, the first chassis 100 may comprise various metals.

Referring to FIG. 14, the second chassis 200 is coupled with the first chassis 100 to receive the display unit that comprises at least one of the backlight assembly and the liquid crystal panel. The second chassis 200 comprises a plurality of sidewalls.

For example, the second chassis 200 comprises four sidewalls forming a rectangular frame. Hereinafter, the four sidewalls will be referred to as a first sidewall 210, a second sidewall 220, a third sidewall 230 and a fourth sidewall 240.

The first sidewall 210 faces the third sidewall 230 and the second sidewall 220 faces the fourth sidewall 240. The first to fourth sidewalls 210, 220, 230 and 240 are interconnected to form a closed loop. When viewed in a plan view, the first to fourth sidewalls 210, 220, 230 and 240 form a rectangular frame.

The second chassis 200 may have length and breadth substantially identical to those of the first chassis 100.

Further, the second chassis 200 may have length and breadth larger than or smaller than those of the first chassis 100.

Furthermore, the sidewalls 210, 220, 230 and 240 of the second chassis 200 may have widths W2 smaller than widths W1 of the sidewalls 110, 120, 130 and 140 of the first chassis 100. For example, the first to fourth sidewalls 210, 220, 230 and 240 of the second chassis 200 may have heights W2 of about 0.1 mm to 2.0 mm, respectively. Further, the first to fourth sidewalls 210, 220, 230 and 240 of the second chassis 200 may have heights H2 of about 0.1 mm to 2.0 mm, respectively.

The second chassis 200 may comprise metal. For example, the second chassis 200 may comprise at least one of stainless steel, iron, aluminum, aluminum alloy and copper. In addition, the second chassis 200 may comprise various metals.

Figure 15:
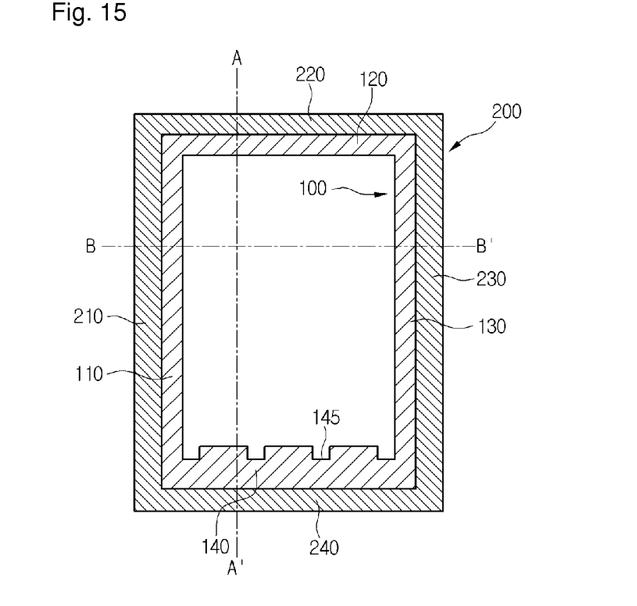
FIG. 15 is a plan view illustrating a state in which a first chassis and a second chassis of a receptacle are coupled with each other according to a second embodiment.
Figure 16:
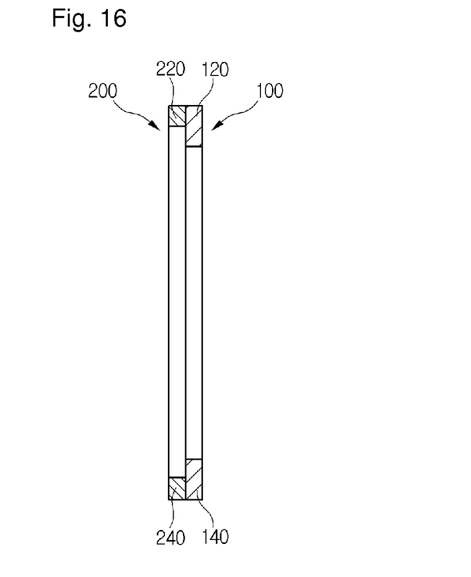
FIG. 16 is a sectional view taken along line A-A' of FIG. 15.

FIG. 15 is a plan view illustrating the receptacle of the display device according to the second embodiment and FIG. 16 is a sectional view taken along line A-A' of FIG. 15.

Referring to FIGS. 15 and 16, the second chassis 200 is coupled on the upper surface of the first chassis 100. The widths W1 of the sidewalls 110, 120, 130 and 140 of the first chassis 100 are greater than the widths W2 of the first to fourth sidewalls 210, 220, 230 and 240 of the second chassis 200.

If the second chassis 200 is coupled on the upper surface of the first chassis 100, a step difference is formed between the first chassis 100 and the second chassis 200.

As illustrated in FIG. 16, when the first chassis 100 is coupled on the lower surface of the second chassis 200, the second and fourth sidewalls 120 and 140 of the first chassis 100 protrude inward than the second and fourth sidewalls 220 and 240 of the second chassis 200.

Figure 17:
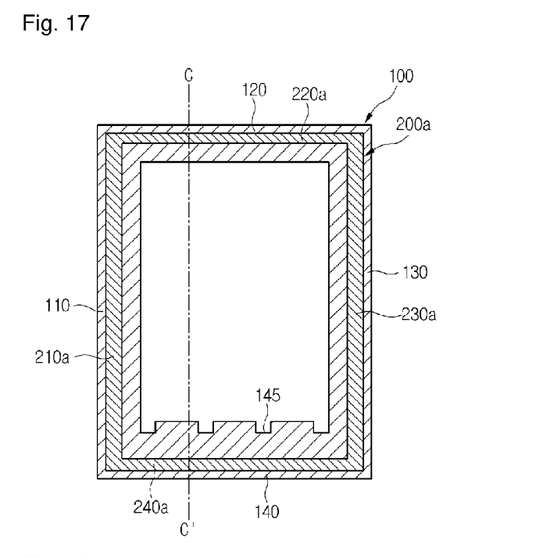
FIG. 17 is a plan view illustrating a state in which a first chassis of a receptacle is coupled with a second chassis having another shape according to a second embodiment.
Figure 18:
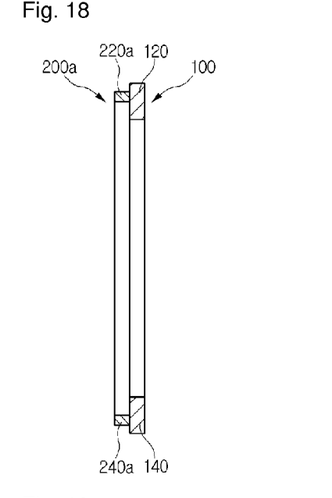
FIG. 18 is a sectional view taken along line C-C' of FIG. 17.

FIG. 17 is a plan view illustrating another type of the receptacle of the display device according to the second embodiment and FIG. 18 is a sectional view taken along line C-C' of FIG. 17.

Referring to FIG. 17, a second chassis 200a has a size smaller than the second chassis 200 of FIG. 14 and may be coupled with the first chassis 100.

Referring to FIG. 17, if the second chassis 200a is coupled on the upper surface of the first chassis 100, a step difference is formed between the first chassis 100 and the second chassis 200a. Further, the second chassis 200a has length and breadth smaller than those of the first chassis 100. If the second chassis 200a is coupled with the first chassis 100, the upper surfaces of the first to fourth sidewalls 110, 120, 130 and 140 of the first chassis 100 may be partially exposed.

As illustrated in FIG. 18, if the second chassis 200a is coupled on the upper surface of the first chassis 100, the surfaces of the second and fourth sidewalls 120 and 140 of the first chassis 100 may be selectively exposed by the second and fourth sidewalls 220a and 240a of the second chassis 200a.

Figure 19:
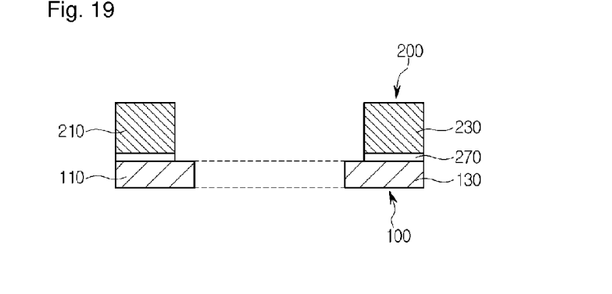
FIGS. 19 and 20 are sectional views taken along line B-B' of FIG. 15, and are sectional views illustrating a coupling method between a first chassis and a second chassis.
Figure 20:
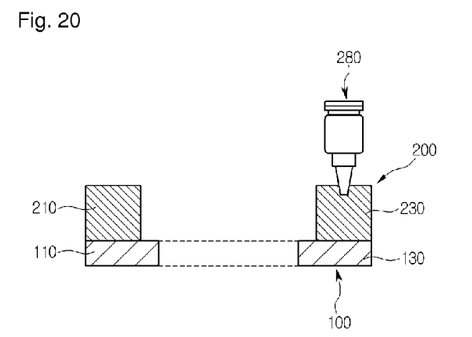

FIGS. 19 and 20 are sectional views taken along line B-B' of FIG. 15.

Hereinafter, a coupling method of the receptacle comprising the first chassis and the second chassis will be described with reference to FIGS. 19 and 20.

Referring to FIG. 19, an adhesive member 270 is interposed between the first chassis 100 and the second chassis 200, so that the first chassis 100 and the second chassis 200 can be coupled with each other. For example, the adhesive member 270 can be prepared in the form of resin or a double coated tape.

When the first chassis 100 is fixed to the second chassis 200 by using resin, synthetic resin or silicon is coated on the upper surfaces of the sidewalls (e.g. the first and third sidewalls 110 and 130) of the first chassis 100, and then the second chassis 200 is seated on the synthetic resin or silicon such that the second chassis 200 can be fixed to the first chassis 100.

Further, when the first chassis 100 is fixed to the second chassis 200 by using a double coated tape, the double coated tape adheres to the upper surfaces of the sidewalls (e.g. the first and third sidewalls 110 and 130) of the first chassis 100, and then the second chassis 200 is seated on the double coated tape such that the second chassis 200 can be integrally formed with the first chassis 100.

Referring to FIG. 20, the first chassis 100 may be coupled with the second chassis 200 through ultrasonic bonding.

According to the ultrasonic bonding, two welding targets are subject to predetermined pressure such that one welding target vibrates relative to the other welding target, so that oxides formed around a diffused part are removed and diffusion occurs among molecules of the welding targets, thereby realizing metal bonding.

When the first chassis 100 is bonded to the second chassis 200 through the ultrasonic bonding, since heat is not generated in a bonding area, the first chassis 100 can be firmly bonded to the second chassis 200 without breakage caused by melting of the bonding area.

Further, the ultrasonic bonding does not cause environmental contamination while shortening the bonding time. In addition, the ultrasonic bonding does not require disposal parts, such as lead or flux, during the welding process regardless of the amount of products.

Furthermore, since the ultrasonic bonding can be applied to parts having materials different from each other, the first chassis 100 can be bonded to the second chassis 200 even if they have materials different from each other.

When the first chassis 100 is fixed to the second chassis 200 through the ultrasonic bonding, the second chassis 200 is seated on the first chassis 100, and then an ultrasonic bonding apparatus 280 is placed on the sidewalls (e.g. the first and third sidewalls 210 and 230) of the second chassis 200, so that the first chassis 100 can be integrally formed with the second chassis 200 through the ultrasonic bonding apparatus 280.

As described above, after the first chassis 100 and the second chassis 200, which comprise metal, are coupled with each other, if one of the liquid crystal panel and the backlight assembly is received in the first chassis 100 and the second chassis 200, the strength of the display device can be reinforced.

Further, since the first chassis 100 and the second chassis 200 are fabricated by using metal, the thickness of the first chassis 100 and the second chassis 200 can be easily adjusted. Thus, the display device can be fabricated with a slim structure and in a small size.

Furthermore, since an existing mold frame is not required, a frame injection molding process or an insert injection molding process is omitted. Thus, the manufacturing cost can be reduced.

Figure 21:
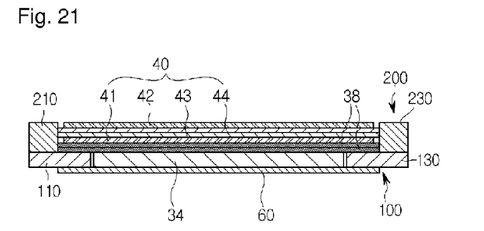
FIG. 21 is a sectional view illustrating a display device according to a second embodiment.

FIG. 21 is a sectional view illustrating the display device according to the second embodiment.

Referring to FIGS. 12, 14 and 21, the first to fourth sidewalls 110, 120, 130 and 140 of the first chassis 100 may have widths W1 greater than widths W2 of the first to fourth sidewalls 210, 220, 230 and 240 of the second chassis 200.

Since the first and third sidewalls 110 and 130 of the first chassis 100 protrude inward than the first and third sidewalls 210 and 230 of the second chassis 200, a step difference is formed between the first chassis 100 and the second chassis 200.

The display unit comprising the liquid crystal panel 40 and the backlight assembly 2 can be received in the first chassis 100 and the second chassis 200 integrally formed with each other while making contact with the sidewalls of the first chassis 100 and the second chassis 200. The display unit comprising the liquid crystal panel 40 and the backlight assembly 2 is substantially identical to the display unit of the first embodiment described in FIG. 10. Accordingly, the same reference numerals and names are used to designate the same elements of the display device of FIG. 10.

The liquid crystal panel 40 is formed by injecting a liquid crystal layer between the TFT substrate 43 and the color filter substrate 44. The first and second polarizers 41 and 42 may be formed on and below the liquid crystal panel 40, respectively.

The backlight assembly 2 comprises the light source (not shown), the optical member 30 and the optical reflection member 60.

Although not shown in the drawings, the light source comprises a lamp such as an LED or a CCFL, and outputs light generated from the lamp to the optical member 30.

The optical member 30 may comprise the light guide plate 34 and the optical sheet 38.

The light guide plate 34 receives light generated from the light emitting section, and uniformly distributes the light over the whole light emitting area of the backlight. Although not shown in the drawings, locking protrusions corresponding to the grooves 105 for receiving light guide plates of the first chassis 100 may be formed at the sidewall of the light guide plate 34.

The optical sheet 38 is attached to the light guide plate 34 and selectively comprises a lens sheet, a diffusion sheet, a protection sheet and the like.

The optical reflection member 60 is attached to the bottom surface of the light guide plate 34 to reflect light, which is leaked through the light guide plate 34 downward, toward the liquid crystal panel 40.

The liquid crystal panel 40 and the backlight assembly 2 are mounted in the receptacle formed by coupling the first chassis 100 with the second chassis 200.

Then, the light guide plate 34 is installed in the first chassis 100 while mating contact with the sidewalls 110, 120, 130 and 140 of the first chassis 100. Here, the light guide plate 34 is coupled with the grooves 105 of the first chassis 100.

Further, the optical sheet 38 and the liquid crystal panel 40 are received on the upper surfaces of the sidewalls 110, 120, 130 and 140 of the first chassis 100. At this time, since the second chassis 200 is fixed to the upper surface of the first chassis 100, the second chassis 200 can protect the backlight assembly 2 and the liquid crystal panel 40.

Although not shown in the drawings, after the liquid crystal panel 40 and the backlight assembly 2 are installed in the receptacle, resin such as silicon may be injected into the boundary between the receptacle and the liquid crystal panel 40 and between the receptacle and the backlight assembly 2.

Thus, the liquid crystal panel 40 and the backlight assembly 2 can be fixed to the receptacle by the silicon. Consequently, the resistance against impact of the display device can be reinforced.

Figure 22:
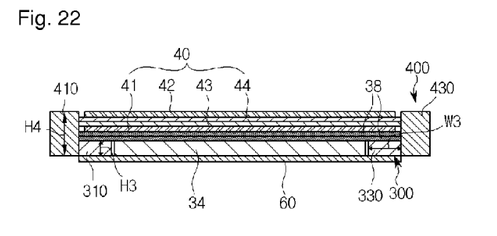
FIG. 22 is a sectional view illustrating a display device according to a third embodiment.

FIG. 22 is a sectional view illustrating a state in which a liquid crystal panel and a backlight assembly are mounted in a receptacle of a display device according to the third embodiment.

A first chassis 300 may have the shape and structure substantially identical to those of the first chassis 100 described in the second embodiment. However, sidewalls (e.g. first and third sidewalls 310 and 330) of the first chassis 300 may have narrow widths W3 of 0.1 mm to 0.2 mm. Further, the sidewalls (e.g. the first and third sidewalls 310 and 330) of the first chassis 300 may have low heights H3 of 0.1 mm to 0.2 mm.

Although not shown in FIG. 22, the second and fourth sidewalls 320 and 340 of the first chassis 300 may also have widths and heights substantially identical to those of the first and third sidewalls 310 and 330 thereof, respectively.

A second chassis 400 has a size larger than that of the first chassis 300 such that the second chassis 400 can receive the first chassis 300. That is, the outer peripheral surfaces of the sidewalls of the first chassis 300 may make contact with the inner peripheral surfaces of the sidewalls of the second chassis 400.

Accordingly, the second chassis 400 may have a size proportional to the size of the first chassis 300.

The sidewalls of the second chassis 400 may have heights H4 longer than the heights H3 of the sidewalls of the first chassis 300. For example, the sidewalls (e.g. the first and third sidewalls 410 and 430) of the second chassis 400 may have heights H4 of 0.2 mm to 4.0 mm.

Although not shown in FIG. 22, the second and fourth sidewalls 420 and 440 of the second chassis 400 may also have widths and heights substantially identical to those of the first and third sidewalls 410 and 430 thereof, respectively.

In order to couple the first chassis 300 with the second chassis 400, an adhesive member is attached to the outer peripheral surfaces of the sidewalls of the first chassis 300 and then the inner peripheral surfaces of the sidewalls of the second chassis 400 are located on the outer peripheral surfaces of the sidewalls of the first chassis 300.

Further, in order to couple the first chassis 300 with the second chassis 400, the outer peripheral surfaces of the sidewalls of the first chassis 300 are located on the inner peripheral surfaces of the sidewalls of the second chassis 400, and then the outer peripheral surfaces of the sidewalls of the second chassis 400 are subject to the ultrasonic bonding.

As the first chassis 300 is coupled with the second chassis 400 as described above, the first chassis 300 is received in the second chassis 400.

Since the sidewalls of the second chassis 400 have the heights H4 greater than the heights H3 of the sidewalls of the first chassis 300, the second chassis 400 protrudes beyond the upper surface of the first chassis 300 by the difference between the height H4 and the height H3 when the second chassis 400 is coupled with the first chassis 300.

Accordingly, the liquid crystal panel 40 and the backlight assembly 2 can be mounted in the first chassis 300 and the second chassis 400 integrally formed with each other.

Then, the light guide plate 34 is installed in the first chassis 300 while making contact with the sidewalls of the first chassis 300, and the optical sheet 38 and the liquid crystal panel 40 are received on the upper surfaces of the sidewalls of the first chassis 300.

Since the second chassis 400 is fixed to the outer peripheral surfaces of the sidewalls of the first chassis 300, the second chassis 400 can protect the side portions of the backlight assembly 2 and the liquid crystal panel 40.

Figure 23:
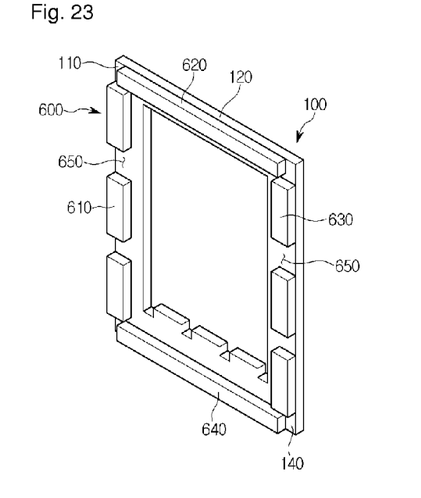
FIGS. 23 and 24 are perspective views illustrating a state in which a first chassis and a second chassis of a receptacle of a display device are coupled with each other according a fourth embodiment.
Figure 24:
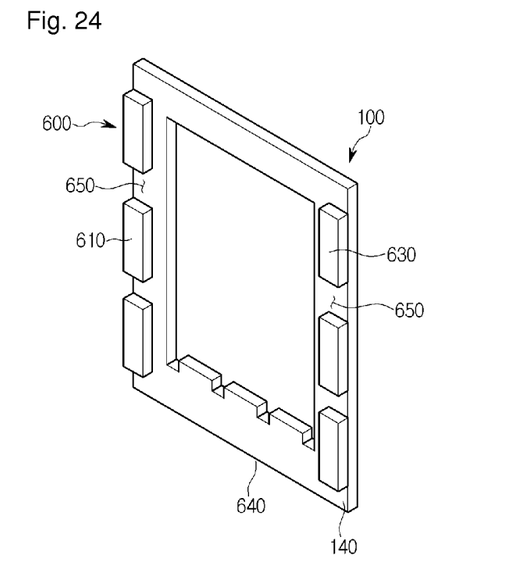

FIGS. 23 and 24 are perspective views illustrating a state in which a first chassis and a second chassis are each other in a receptacle of a display device according the fourth embodiment.

Since the first chassis 100 is substantially identical to that described in the second embodiment with reference to FIGS. 12 and 13, a detailed description will be omitted.

Referring to FIG. 23, the second chassis 600 is selectively formed on the first chassis 100. The second chassis 600 is formed with grooves 650 that selectively expose the surface of the first chassis 100.

That is, the first and third sidewalls 610 and 630 of the second chassis 600 are selectively formed to partially expose the first and third sidewalls 110 and 130 of the first chassis 100. Further, the second and fourth sidewalls 620 and 640 of the second chassis 600 cover the second and fourth sidewalls 120 and 140 of the first chassis 100.

If one or more grooves 650 are formed in the first and third sidewalls 610 and 630 of the second chassis 600, the second chassis 600 can be easily coupled with an external coupling structure (not shown) such as a case.

Referring to FIG. 24, the sidewalls of the second chassis 600 can be selectively formed. For example, the second sidewall 620 or the fourth sidewall 640 of the second chassis 600 as illustrated in FIG. 23 may also be removed.

Further, the grooves 650 may be formed at the first and third sidewalls 610 and 630 of the second chassis 600.

Figure 25:
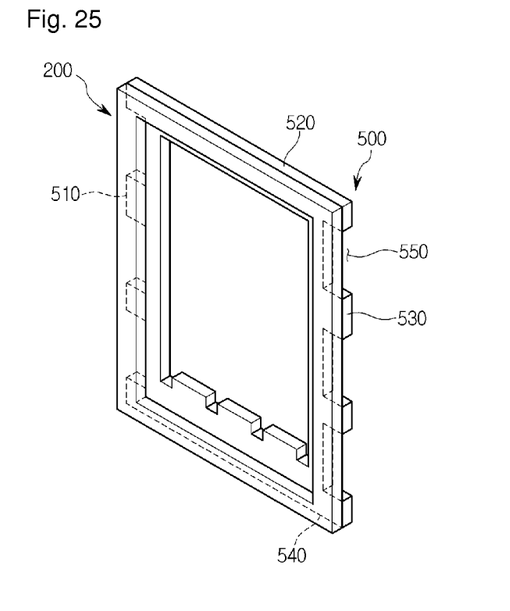
FIG. 25 is a perspective view illustrating a state in which a first chassis and a second chassis of a receptacle of a display device are coupled with each other according a fifth embodiment.

FIG. 25 is a perspective view illustrating a state in which a first chassis and a second chassis are coupled with each other in a receptacle of a display device according the fifth embodiment.

Since the second chassis 200 is substantially identical to that described in the second embodiment with reference to FIG. 14, a detailed description will be omitted.

The first chassis 500 can have the structure and shape substantially identical to those of the first chassis described in the second embodiment except for groves 550. Further, the grooves 550 may be selectively formed in first and third sidewalls 510 and 530.

As described above, if one or more grooves 550 are formed in the first and third sidewalls 510 and 530 of the first chassis 500, the first chassis 500 can be easily coupled with an external coupling structure (not shown) such as a case.

Hereinafter, a receptacle of a display device according the sixth embodiment will be described with reference to FIGS. 26 and 27.

Figure 26:
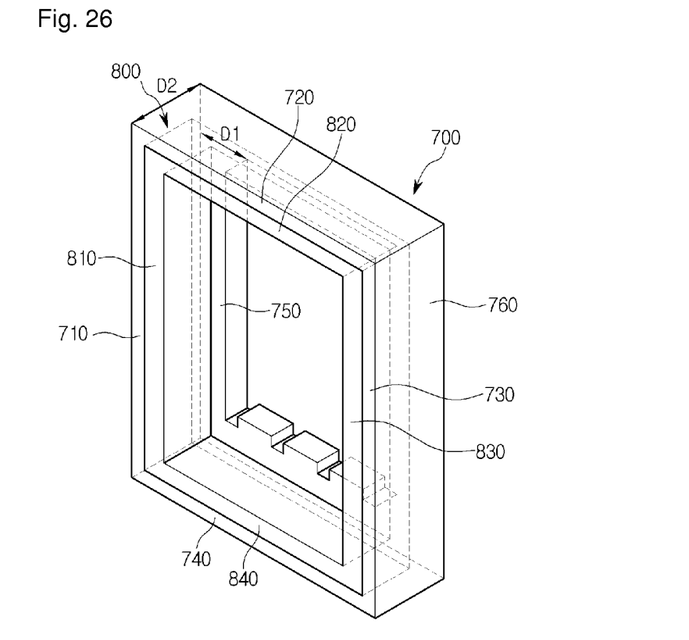
FIG. 26 is a perspective view illustrating a state in which a first chassis and a second chassis of a receptacle are coupled with each other according a sixth embodiment.
Figure 27:
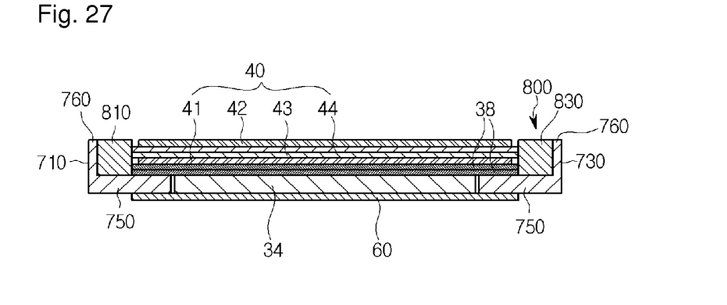
FIG. 27 is a sectional view illustrating a display device according to a sixth embodiment.

FIG. 26 is a perspective view illustrating a state in which a first chassis and a second chassis are coupled with each other in a receptacle according the sixth embodiment, and FIG. 27 is a sectional view illustrating a state in which a liquid crystal panel and a backlight assembly are coupled with the receptacle.

Referring to FIGS. 26 and 27, the first chassis 700 receives at least one of the backlight assembly 2 and the liquid crystal panel 40, and comprises a plurality of sidewalls.

For example, the first chassis 700 may comprise four sidewalls forming a rectangular frame. Hereinafter, the four sidewalls will be referred to as a first sidewall 710, a second sidewall 720, a third sidewall 730 and a fourth sidewall 740.

The first sidewall 710 faces the third sidewall 730 and the second sidewall 720 faces the fourth sidewall 740. The first to fourth sidewalls 710, 720, 730 and 740 are interconnected to form a closed loop. When viewed in a plan view, the first to fourth sidewalls 710, 720, 730 and 740 form a rectangular frame.

The first to fourth sidewalls 710, 720, 730 and 740 are vertically bent. That is, the first to fourth sidewalls 710, 720, 730 and 740 comprise a horizontal section 750 for receiving a light guide plate 34, and a vertical section 760 vertically extending upward from the horizontal section 750.

For example, the horizontal section 750 of the first to fourth sidewalls 710, 720, 730 and 740 may have a length D1 of 0.1 mm to 3.0 mm. Further, the vertical section 760 of the first to fourth sidewalls 710, 720, 730 and 740 may have a length D2 of 0.1 mm to 3.0 mm.

The vertical bending of the first to fourth sidewalls 710, 720, 730 and 740 can be achieved through a hemming process.

Since the second chassis 800 is the shape substantially identical to that described in the second embodiment with reference to FIG. 14, a detailed description will be omitted. The second chassis 800 has a width shorter than that of the second chassis 200 described in the second embodiment.

If the first chassis 700 is coupled with the second chassis 800, the second chassis 800 is received in the horizontal section 750 and the vertical section 760 of the first to fourth sidewalls 710, 720, 730 and 740 formed in the first chassis 700.

That is, the horizontal section 750 and the vertical section 760 of the first to fourth sidewalls 710, 720, 730 and 740 formed in the first chassis 700 make contact with the lower surfaces and the outer sides of sidewalls 810, 820, 830 and 840 of the second chassis 800, respectively, so that the second chassis 800 can be received in the first chassis 700.

The first chassis 700 and the second chassis 800 may be integrally formed with each other by using an adhesive member or through an ultrasonic bonding process.

Then, since the lower surfaces and the outer sides of sidewalls 810, 820, 830 and 840 of the second chassis 800 are fixedly supported by the horizontal section 750 and the vertical section 760 of the first to fourth sidewalls 710, 720, 730 and 740 formed in the first chassis 700, the first chassis 700 can be firmly coupled with the second chassis 800.

Further, the strength of the first chassis 700 and the second chassis 800, which are integrally formed with each other, is reinforced, so that the liquid crystal panel 40 and the backlight assembly 2 can be protected from external impact.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

According to the embodiments, the display devices are applied to display modules.

The invention claimed is:

1. A display device comprising:
a receptacle comprising a sidewall section, and a support section extending from an inner side of the sidewall section;
a liquid crystal panel and a backlight assembly, at least one of which is received in the receptacle; and
an impact absorption member provided at an inner side surface of the sidewall section,
wherein the entire receptacle comprises a metal,
wherein the inner side surface of the sidewall section extends to the support section vertically,
wherein at least one locking groove is formed at an inner side of at least one of the sidewall section and the support section,
wherein a plurality of extensions are formed to extend further from one portion of the support section, the plurality of extension being coplanar with the support section, and the plurality of extensions are connected to the one portion of the support section along their entire lengths,
wherein the backlight assembly comprises:
an optical reflection member provided on a rear surface of the receptacle to cover a through hole formed by the support section;
a light source provided at one side of the receptacle;
a light guide plate to improve brightness uniformity of light generated from the light source; and
an optical sheet provided on the light guide plate,
wherein the light guide plate and the optical sheet comprise a protrusion coupled with the at least one locking groove,
wherein the protrusion is formed in a fan shape, and
wherein the impact absorption member is disposed on a lateral side of the liquid crystal panel and the optical sheet to contact both the liquid crystal panel and the optical sheet, the lateral side being a surface of the liquid crystal panel that is parallel to a thickness direction of the liquid crystal panel.

2. The display device as claimed in claim 1, wherein the impact absorption member is a part of the optical sheet, and the part of the optical sheet is bent in parallel with the inner side of the sidewall section while covering the inner side of the sidewall section.

3. The display device as claimed in claim 2, wherein the impact absorption member comes in surface contact with the inner side of the sidewall section.

4. The display device as claimed in claim 1, wherein the sidewall section has widths of about 0.1 mm to 3.0 mm.

5. The display device as claimed in claim 1, wherein the support section has widths of about 0.5 mm to 2.0 mm and thicknesses of about 0.1 mm to 1.0 mm.

6. The display device as claimed in claim 1, wherein the impact absorption member is provided along the inner side surface of the sidewall section except where the at least one locking groove is formed at the inner side of the at least one of the sidewall section.

7. The display device as claimed in claim 1, wherein the impact absorption member is only in contact with sides of a TFT substrate and a CF substrate of the liquid crystal panel.

8. A display device comprising:
a display unit comprising at least one of a liquid crystal panel and a backlight assembly including an optical sheet;
a first chassis comprising sidewalls for receiving the display unit;
a second chassis comprising sidewalls such that the second chassis is coupled with the first chassis; and
an impact absorption member disposed on a lateral side of the liquid crystal panel and the optical sheet to contact both the liquid crystal panel and the optical sheet, the lateral side being a surface of the liquid crystal panel that is parallel to a thickness direction of the liquid crystal panel,
wherein the entire first chassis and second chassis comprise a metal,
wherein the first chassis and the second chassis have a rectangular shape,
wherein a bottom surface of the first chassis and a bottom surface of the second chassis have an opened structure,
wherein the first chassis is coupled with the second chassis through an ultrasonic bond, and
wherein the first chassis has a rectangular frame shape defined by the sidewalls, and at least one of the sidewalls of the first chassis comprises a lamp receiving section and a section for receiving a light guide plate, the lamp receiving section further including a plurality of extensions formed to extend further from the section for receiving a light guide plate, the plurality of extension being coplanar with the section for receiving a light guide plate, and the plurality of extensions are connected to the one portion of the support section along their entire lengths.

9. The display device as claimed in claim 8, wherein the second chassis comprises four sidewalls forming a rectangular frame or at least two sidewalls, in which at least one of the sidewalls is open.

10. The display device as claimed in claim 8, wherein the second chassis has a size smaller than or equal to a size of the first chassis, and a width of the sidewall of the second chassis is shorter than a width of the sidewall of the first chassis such that the second chassis is in or on the first chassis.

11. The display device as claimed in claim 8, wherein the sidewalls of the first chassis comprise a horizontal section and a vertical section extending vertically from the horizontal section, in which the second chassis is accommodated in the first chassis while making contact with the sidewalls of the first chassis.

12. The display device as claimed in claim 8, wherein the second chassis has a size larger than a size of the first chassis, so that the first chassis is accommodated in the second chassis.

13. The display device as claimed in claim 8, wherein grooves are selectively formed in sidewalls of at least one of the first chassis and the second chassis.

14. The display device as claimed in claim 8, wherein the sidewalls of the first chassis having outer edges and inner edges,
   wherein the sidewalls of the second chassis having outer edges and inner edges, and
   wherein distances between the outer edges of the first chassis and the outer edges of the second chassis are the same for all sidewalls of the first chassis and the second chassis.

15. A method for manufacturing a display device, the method comprising:
   forming a first chassis provided with sidewalls for receiving at least one of a liquid crystal panel and a backlight assembly including an optical sheet;
   forming a second chassis provided with sidewalls coupled with the first chassis;
   coupling the first chassis with the second chassis; and
   providing an impact absorption member on a lateral side of the liquid crystal panel and the optical sheet to contact both the liquid crystal panel and the optical sheet, the lateral side being a surface of the liquid crystal panel that is parallel to a thickness direction of the liquid crystal panel,
   wherein the entire first chassis and second chassis comprise a metal,
   wherein the first chassis and the second chassis have a rectangular shape
   wherein a bottom surface of the first chassis and a bottom surface of the second chassis have an opened structure,
   wherein the first chassis is coupled with the second chassis through an ultrasonic bonding process,
   wherein the first chassis has a rectangular frame shape defined by the sidewalls, and at least one of the sidewalls of the first chassis comprises a lamp receiving section and a section for receiving a light guide plate, the lamp receiving section further including a plurality of extensions formed to extend further from the section for receiving a light guide plate, the plurality of extension being coplanar with the section for receiving a light guide plate, and the plurality of extensions are connected to the one portion of the support section along their entire lengths.

16. The method as claimed in claim 15, wherein the second chassis has a size smaller than or equal to a size of the first chassis, and a width of the sidewall of the second chassis is shorter than a width of the sidewall of the first chassis, so that the second chassis is coupled with an upper portion of the first chassis.

17. The method as claimed in claim 15, wherein the second chassis has a size smaller than a size of the first chassis, so that the first chassis is accommodated in the second chassis.

18. The method as claimed in claim 15, wherein the sidewalls of the first chassis having outer edges and inner edges,
   wherein the sidewalls of the second chassis having outer edges and inner edges, and
   wherein distances between the outer edges of the first chassis and the outer edges of the second chassis are the same for all sidewalls of the first chassis and the second chassis.

* * * * *